United States Patent [19]

Carpenter

[11] Patent Number: 4,842,458
[45] Date of Patent: Jun. 27, 1989

[54] RETRACTABLE TIE-DOWN

[76] Inventor: Victor S. Carpenter, 8728 Tyrone, Panorama City, Calif. 91402

[21] Appl. No.: 140,602

[22] Filed: Jan. 4, 1988

[51] Int. Cl.$^4$ ............................. B60P 7/08; B60P 7/16
[52] U.S. Cl. ........................................ 410/3; 410/103; 242/107
[58] Field of Search ............... 410/3, 96, 97, 100–103, 410/106, 107, 111, 116, 2, 34, 36, 37, 50; 242/107

[56] References Cited

U.S. PATENT DOCUMENTS

| 2,508,372 | 5/1950 | Carlson | 242/107 X |
| 3,456,896 | 7/1969 | Fisher | 242/107 |
| 3,827,650 | 8/1974 | Stevens et al. | 242/107 X |
| 4,026,494 | 5/1977 | Tanaka | 242/107 |
| 4,099,683 | 7/1978 | Stouffer et al. | 242/107 |
| 4,243,350 | 1/1981 | Hall | 410/100 |
| 4,382,736 | 5/1983 | Thomas | 410/103 X |
| 4,441,736 | 4/1984 | Shedden | 410/3 X |

FOREIGN PATENT DOCUMENTS 2736973 3/1979 Fed. Rep. of Germany ...... 242/107

Primary Examiner—Dennis H. Pedder
Assistant Examiner—Gary C. Hoge
Attorney, Agent, or Firm—Roger A. Marrs

[57] ABSTRACT

A tie-down arrangement for releasably securing a load to the floor of a truck bed by the use of a tensioned strap or belt. One end of the belt is looped about a spindle after passing through a slot in the hub of a reel. A securement pin interconnects the hub to the spindle so that a unitary construction is produced. A spring retractor is operably coupled between the reel and a fixed mounting bracket so that the belt or strap is biased into a storage position in the form of a coil about the hub. The opposite end of the belt or strap terminates in a fastening hook and an adjustment clamp is carried on the belt or strap for shortening or lengthening the belt or strap.

3 Claims, 1 Drawing Sheet

RETRACTABLE TIE-DOWN

BACKGROUND OF THE INVENTION

1. Field of the Invention

The present invention relates to automotive tie-down devices and more particularly to a novel tie-down apparatus mounted on the floor of a truck bed and having a tensioned belt or strap releasably attached to cargo or a load intended to be supported within the truck bed.

2. Brief Description of the Prior Art

In the past, it has been the conventional practice to employ a variety of straps, ropes, sliding cars and the like for holding cargo or other loads in a secure position within the confines of a truck bed. Generally, it is common practice to temporarily secure a motorcycle in a truck or trailer by using a tie-down strap having a hook at each end. Although these tie-downs are successful in retaining the motorcycle or other load in place, the tie-downs of this type generally get lost, misplaced, stolen, or become easily soiled. Such tie-downs can be difficult to hook up by the user without help and any shift in the load will allow unintentional release or disconnect so that the hooks will bounce or flap about. Such an event will not only release the load but will scratch the paint on whatever vehicle is being used for hauling.

Therefore, a long standing need has existed to provide a cargo tie-down which is not only easy to use, even by one person, but one which places a bias or positive restraint on the cargo so that inadvertent detachment is avoided. Further advantage would be to employ such tie-downs that would be theftproof and which can be conveniently and compactly installed at predetermined locations on the truck bed or trailer so as to be always in place and ready for use.

SUMMARY OF THE INVENTION

Accordingly, the above problems and difficulties are obviated by the present invention which provides a novel tie-down arrangement for releasably securing a cargo or load to the floor of a truck bed or trailer by the use of a tensioned strap or belt. One end of the belt is looped about a spindle having its opposite ends carried on a yoke of an anchor fixed to the floor of the truck bed or trailer. The yoke includes a rotatable reel having a hub rotating about the spindle and including a slot through which the belt passes. Securement means interconnects the hub to the spindle so that a unitary construction is produced and resilient means are operably coupled between the reel and the mount so that the belt or strap is biased into a storage position in the form of a coil about the hub. The opposite end of the belt or strap from its end attached to the pin and reel terminates in a fastening hook. Adjustment means is carried along the length of the belt or strap for selectively shortening or lengthening the belt or strap at the selection of the user.

Therefore, it is among the primary objects of the present invention to provide a novel cargo tie-down assembly which includes a mount carrying a tensioned strap so that attachment of the free end of the strap to the cargo places a positive bias on the cargo to maintain the cargo in its loaded position.

Another object of the present invention is to provide a tensioned tie-down means for holding a cargo in a particular location on a truck bed or trailer, which includes a strap having a retraction means mounted on the floor of the truck bed or trailer so that a positive bias is placed on the cargo when the belt is attached thereto.

Another object of the present invention is to provide a simple and convenient tie-down means for supporting cargo on a truck bed or trailer, which includes tensioning means for placing a positive bias on the cargo once the apparatus has been installed thereon.

Yet a further object of the present invention is to provide a pivoted anchoring means, including a resilient retraction means coupled to a strap so as to put a positive bias thereon for holding cargo attached to the free end of the strap in a stable position.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
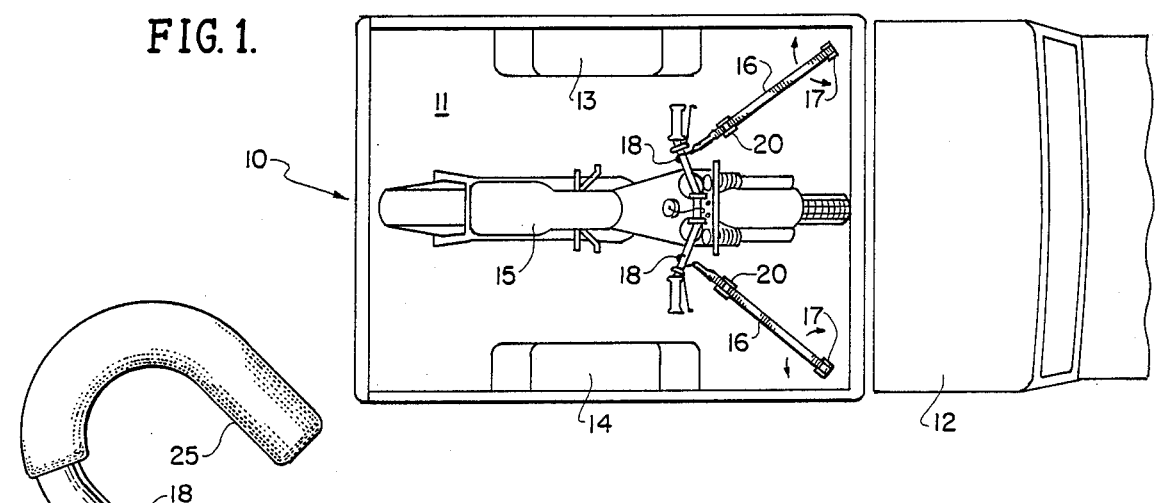
FIG. 1 is a top plan view of a vehicle truck bed carrying a cargo which is held in position by the novel tie-down apparatus of the present invention.

Referring to FIG. 1, a truck bed is illustrated by the numeral 10 which includes a floor 11 carried on a chassis at the rear of a truck cab 12. The floor 11 is used to support a cargo, load or other equipment intended to be carried from place to place. Normally, wheel wells 13 and 14 rise from the floor 11 and the cargo is disposed between the wheel wells. In the present instance, the cargo takes the form of a motorcycle 15 intended to be carried in an upright position on the truck bed floor 11. In order to stabilize and support the motorcycle, the tie-down apparatus of the present invention is employed so that the cargo will be maintained in position on the truck bed floor and will not move, slide or topple from its loaded position.

In one form of the invention, the tie-down apparatus includes an elongated strap 16 which is attached at one end to an anchoring means 17 and carries a hook 18 at its opposite end, releasably secured to the cargo. In the present instance, the hook 18 is passed over the handlebars of the motorcycle 15. An adjustment means 20 is carried on the strap or belt 16 and is employed for adjusting the length of the strap at the selection of the user. It is to be understood that the anchor means 17 may be mounted so as to pivot in the direction of the arrows as shown, or the anchoring means may be first positioned into a desired angular location with respect to the load, followed by tightening or fastening of the anchor means to the floor 11. Furthermore, it is to be understood that the anchor means 17 includes a positive biasing means for placing a tension or load on the strap or belt 16 in order to place a tension on the load to maintain the tie-down apparatus taut. Therefore, the load cannot be inadvertently released as the vehicle travels over an uneven or rough surface.

Figure 2:
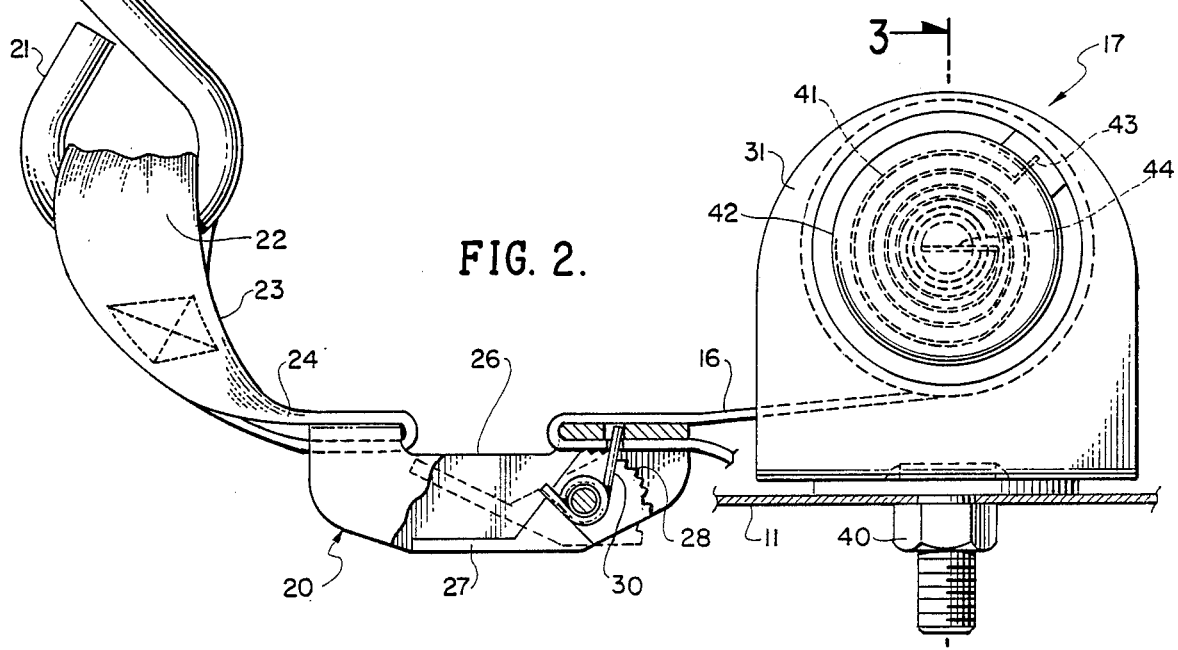
FIG. 2 is an enlarged side elevation view of the tie-down apparatus employed in FIG. 1.

Referring now in detail to FIG. 2, it can be seen that the hook 18 is of a general S configuration, having an eyelet portion 21 captured within a loop 22 of an intermediate strap 23, which also includes a second loop 24 attached to the adjustment means 20. The opposite end of the hook 18 from the eyelet 21 is an open hook which is covered by a plastic cushion, as indicated by numeral 25.

The strap adjustment means 20 is employed for lengthening or shortening the strap or belt 16. It can be seen that the means includes a body 26 having one end through which the loop 24 passes and wherein the opposite end accommodates a turn of the strap 16. A thumb-operated level 27 is used, which includes an irregular frictional portion 28. When the lever 27 is in the solid line position, the friction portion 28 engages with a portion of the strap 16 so that it is secured. A spring 30 biases the lever into the solid line position. However, when the user places his thumb on the lever and displaces the lever to the position shown in broken lines, the friction portion 28 is removed from the belt portion 16 and the belt may be slid in either direction through the body 26 to shorten or lengthen the strap.

FIG. 2 further illustrates an automatic retraction mechanism which places a tension on the strap or belt 16. The mechanism is additionally shown in FIG. 3 wherein a yoke 31 is provided for rollably supporting a reel 32 on a spindle 33. The reel 32 includes an elongated slotted hub 34 on which the length of strap or belt 16 is coiled or wound when in the storage position, as illustrated. The end of strap 16 passes through the slot, shown in FIG. 4, where it is wrapped about the spindle 33. Bushings 35 and 36 support the spindle 33 between the legs of the yoke 31 and a pin 37 couples the spindle and hub of the reel together so that rotation occurs as a unit. The yoke 31 is mounted to the floor 11 of the truck bed by means of a threaded bolt and nut arrangement 40. It is to be understood that the mounting may be pivotal so that the yoke will automatically seek a proper angle of tensioning when the hook 18 is placed abut the cargo or load. The arrows shown in FIG. 1 illustrate a pivot angle that may be assumed by the yoke and strap arrangement. If desired, the yoke may be left to freely pivot or the bolt and nut arrangement 40 may be cinched tight to prevent additional rotation after the yoke has been selectively aligned by the user.

Figure 3:
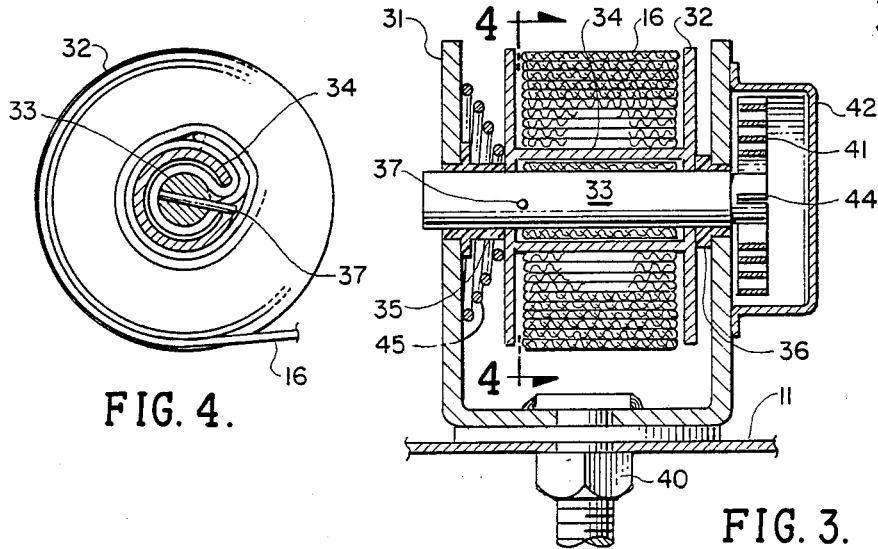
FIG. 3 is a transverse cross-sectional view of the positive biasing means used in the tie-down apparatus as taken in the direction arrows 3—3 of FIG. 2.

FIGS. 2 and 3 further illustrate that tension or biasing of the strap into its stored position as coiled about the hub 34 is achieved by a negator or leaf spring arrangement 41 carried within a side housing 42. One end of the spring 41 is attached to the fixed yoke 31, such as by a spring ear 43, while the opposite end of the spring is inserted into a notch or slot provided in the spindle 33. Such an arrangement is indicated by numeral 44. A stabilizing coil spring 45 is disposed between the inside surface of the yoke 31 and the outside of the reel 32.

Figure 4:
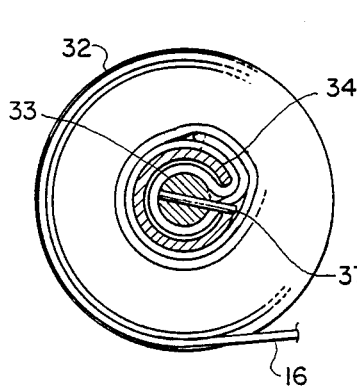
FIG. 4 is a cross-sectional view of the inner shaft and hub as taken along lines 4—4 of FIG. 3.

FIG. 4 more clearly illustrates that the pin 37 interconnects the spindle 33 with the hub 34 of the reel 32 so that the entire assembly will rotate against the spring coiling mechanism as the hook 18 is outwardly drawn from the strap stored position on the reel. However, once the hook has been attached to the cargo, the spring bias of the spring 41 will tension the strap 16 in an effort to draw the strap back into its coiled storage position. Therefore, it can be seen that a steady tension is applied to the strap to maintain it taut and that even though the load may shift, the strap will extend or retract accordingly. By this means, the hook 18 is maintained in proper attachement to the load and will not dislodge or release inadvertently.

While particular embodiments of the present invention have been shown and described, it will be obvious to those skilled in the art that changes and modifications may be made without departing from this invention it is broader aspects and, therefore, the aim in the appended claims is to cover all such changes and modifications as fall within the true spirit and scope of this invention.

What is claimed is:

1. A retractable tie-down for the bed of a truck comprising the combination of:

an elongated belt having opposite ends provided with loops;

a hook member carried in one of said belt end loops and a spindle carried in the other of said belt end loops;

a reel having a slotted storage hub, said hub surrounding said spindle and provided with a slot for passing said belt end loop therethrough for engagement with said spindle;

a securement pin interconnecting said reel hub with said spindle;

a mounting yoke carried on the bed of the truck rotatably supporting said reel and said belt;

a spring retractor operably coupled between said reel and said mounting yoke for normally biasing said belt into a yieldable storage position in the form of a coil about said hub;

an adjustment clamp carried on the length of said belt midway between its opposite ends in spaced relationship to said hook and said mounting yoke for selectively shortening or lengthening said belt;

anchor means pivotally supporting said mounting yoke on the bed of the truck for operation under load in a fixed position or in a pivoting position; and securement means carried on said anchor means for selectively selectively securing said mounting yoke in said fixed position and releasing said mounting yoke for operation in said pivoting position.

2. The invention as defined in claim 1 wherein:

a pair of said belts and retractors are disposed in spaced-apart relationship for cooperatively supporting an article to be transported therebetween.

3. The invention as defined in claim 2 including:

lateral spring means disposed between said mounting bracket and said reel for stabilizing said reel during a belt shortening or lengthening procedure.

* * * * *